UNITED STATES PATENT OFFICE.

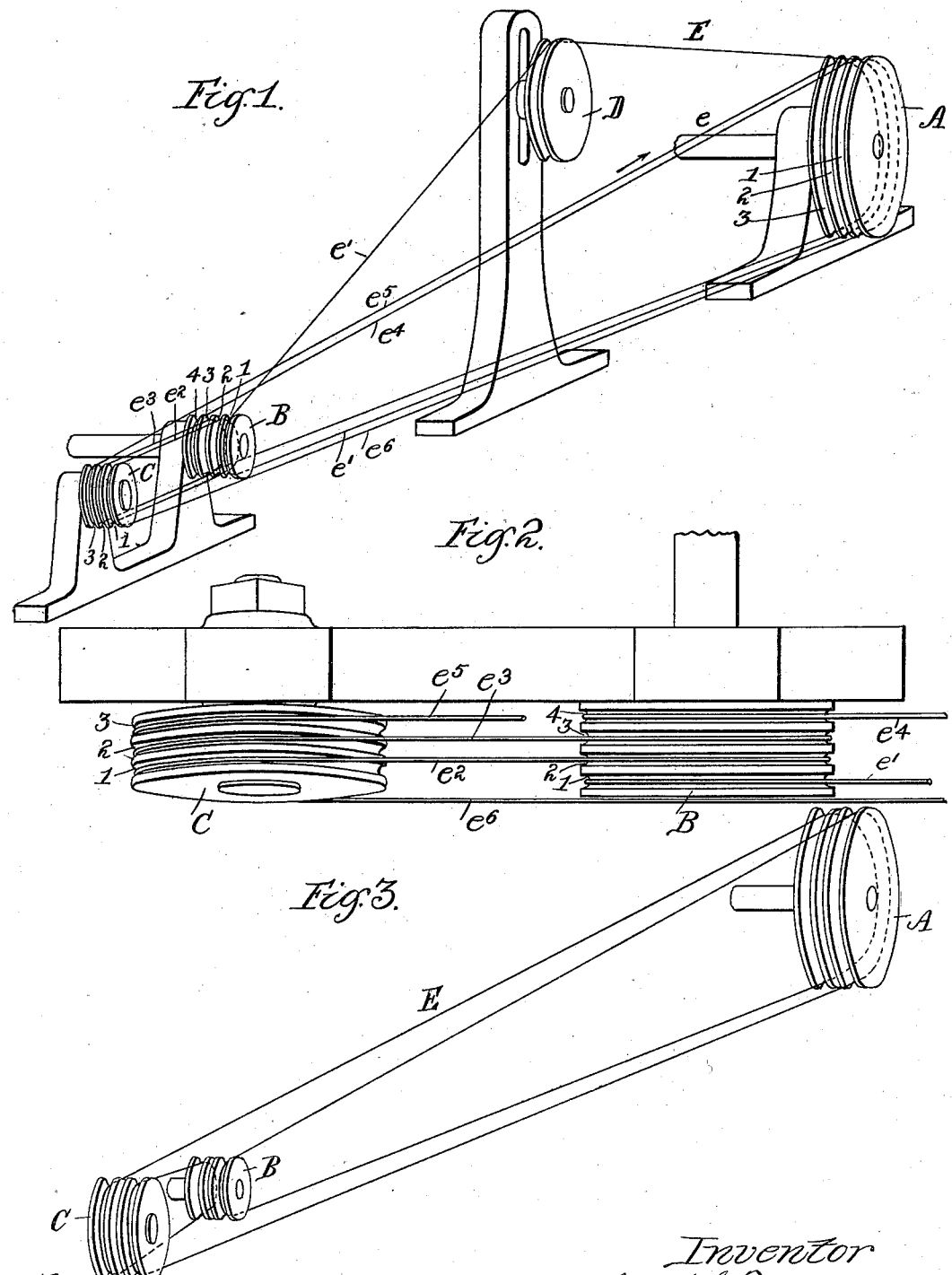

JOSEPH G. FALCON, OF EVANSTON, ILLINOIS.

DEVICE FOR TRANSMITTING POWER.

SPECIFICATION forming part of Letters Patent No. 626,993, dated June 13, 1899.

Application filed February 7, 1898. Serial No. 669,309. (No model.)

*To all whom it may concern:*

Be it known that I, JOSEPH G. FALCON, a citizen of the United States, residing at Evanston, in the county of Cook and State of Illinois, have invented certain new and useful Improvements in Devices for Transmitting Power, of which the following is a specification.

The present invention relates to that class of devices for transmitting power in which a belt, a chain, a rope of any material, (including a wire rope or cable,) or an equivalent device is used to transmit power from one wheel, pulley, drum, shaft, or equivalent device to another; but since in its preferred embodiment the invention contemplates the use of a wire rope and a system of pulleys over which it is rove, for the sake of brevity in the following description and in the claims the terms "rope" and "pulley" will be adhered to, always, however, with the understanding that the former comprehends a belt, a chain, or an equivalent device and the latter comprehends wheels other than "pulleys," strictly so-called, drums, shafts, and equivalent devices.

More particularly stated, the invention relates to that class of rope-drive systems in which more than two pulleys are so disposed that the rope may be rove around them in such manner that it will completely surround and have contact with the entire circumference of one of the pulleys—the one with which the difficulty is ordinarily experienced. The pulley here last referred to will, for the sake of conciseness, be hereinafter called the "driven pulley," but always with the understanding that the terms "driven pulley" and "driving - pulley" are throughout this specification, used interchangeably. If the pulley in question were on the armature-shaft of a dynamo, the term "driven pulley" as applied to it would be technically correct; but, on the other hand, if it were on the armature-shaft of an electric motor the term "driving-pulley" would be correct. Hence in construing this specification these terms are to be considered as terms of description and not terms of limitation further than as suggested.

In addition to the driven pulley the system comprises a plurality of other pulleys disposed upon equidistant lines radiating from the axis of the driven pulley—that is to say, all the sectors formed by the imaginary lines radiating from the axis of the driven pulley and cutting the other pulleys will be equal in respect to the number of degrees embraced by them. To be more explicit, I prefer to use two pulleys in addition to the driven pulley (these two pulleys being, for the sake of brevity and distinctness, hereinafter called the "driving-pulley" and the "idler," respectively,) and they are disposed upon lines radiating from the driven pulley at diametrically opposite points, so that said lines are equidistant, each of the two sectors embracing one hundred and eighty degrees; but the invention is not limited to a system of pulleys in which these additional pulleys are strictly a driving-pulley and an idler.

In fact, the invention relates to a system of pulleys such as described regardless of their names or purposes, and in this specification distinctive names are applied simply for the sake of convenience and facility in describing and claiming the invention.

The object of the invention is to provide an improved rope-drive system of this class, and in order to accomplish this object the rope is rove one or more times around the driving and driven pulleys, each wrap or loop embracing both pulleys and having contact with one-half of the periphery of each of them, and it is also rove an equal number of times and in like manner around the driven pulley and idler, and in addition to this two laps of it extend directly from the driving-pulley to the idler without touching the driven pulley, and it is in this latter feature that the novelty of the present invention resides. In this way the idler is, in fact, made to do duty as an auxiliary driving-pulley, because power is transmitted to it directly from the driving-pulley, and this power is again transmitted from the idler to the driven pulley by the loop or wrap of the rope which embraces them, so that the arrangement amounts to disposing the driven pulley between two driving-pulleys, both of which are geared to the driven pulley by a single rope. As hereinafter fully described, the number of wraps or loops embracing the pulleys in pairs, as above described, may be increased indefinitely without departing from the spirit of the invention.

A system such as described not only produces the necessary friction between the driving-rope and the driven pulley, but in addition to this it relieves the driven shaft of any unequal or unbalanced lateral strain. The strain which is put upon it by the wrap or wraps of the rope which embrace the driving and driven pulleys and has a tendency to pull the driven pulley toward the driving-pulley is exactly balanced by the strain which is put upon it by the wrap or wraps of the rope which embrace the driven pulley and idler and has a tendency to pull the driven pulley toward the idler.

Each of the pulleys may consist of a single individual part, in which case it preferably has a separate groove for each wrap or loop of the rope which touches it, or it may be made up of a number of parts, one for each of said wraps or loops. In other words, the term "pulley" as herein used is intended to comprehend not only an individual part, but a plurality of parts coöperating together to produce the results herein ascribed to the individual part called a "pulley."

The invention consists in the features of novelty that are herein fully described, and in order that it may be fully understood I will describe it with reference to the accompanying drawings, which are made a part of this specification, and in which—

Figure 1 is a perspective view of a device for transmitting power embodying the invention in its preferred form. Fig. 2 is a plan view of a portion thereof. Fig. 3 is a perspective view of a device of somewhat different form embodying some features of the invention.

A represents the driving-pulley, B the driven pulley, C the idler, and D a tightening-pulley, around all of which is rove the rope E. Each of the pulleys A, B, and C in the preferred form of the invention consists of a single individual part having in its periphery a groove for each wrap of the rope which has contact with it, and in the drawings these grooves are numbered consecutively. Starting at the point $e$ and proceeding in the direction opposite that indicated by the arrow the rope is rove as follows: to and half-way around the idler C, occupying its groove 3, thence to and half-way around the driven pulley B, occupying its groove 3, thence back to and half-way around the idler C, occupying its groove 2, thence again to and half-way around the driven pulley B, occupying its groove 2, thence back to and half-way around the idler C, occupying its groove 1, thence to and half-way around the driving-pulley A, occupying its groove 1, thence over the tightening-pulley D, (if one be employed,) thence to and half-way around the driven pulley B, occupying its groove 1, thence to and half-way around the driving-pulley A, occupying its groove 2, thence to and half-way around the driven pulley B, occupying its groove 4, thence to and half-way around the driving-pulley A, occupying its groove 3, returning to the point $e$. With this arrangement it will be seen the rope has frictional contact with the entire periphery or circumference of the driven pulley, and in this way a maximum frictional contact is obtained. It will be seen also that the strains which are put upon the driven pulley by the two wraps or loops $e'$ and $e^4$, which strains tend to draw the driven pulley toward the driving-pulley, are balanced by the strains which are put upon the said driven pulley by the two wraps or loops $e^2$ and $e^3$, which tend to draw the driven pulley toward the idler C.

It is found in actual practice that the frictional contact of the rope, when rove in the manner described, with the several pulleys is so great that there is absolutely no slipping and the strain upon the tightening-pulley D is almost nothing, and it is found also that the strains upon the driven pulley are so nearly balanced that all unequal or unbalanced lateral strains upon its shaft are practically eliminated.

As far as it is practicable to do so the several pulleys are so grooved and disposed that the several laps of the rope shall lie in planes that are as nearly parallel as possible under the circumstances. Where space will permit it, the driven pulley and idler, although of the same diameter, may be located at such distance apart that the laps $e^5$ and $e^6$ of the rope may pass directly from the large driving-pulley A to the idler C without contact with the laps $e^4$ and $e'$ respectively, and where the driven pulley and idler cannot be placed far enough apart to produce this result it may be accomplished either by canting the idler, as shown in Fig. 2, or by making the idler of larger diameter than the driven pulley, as shown in Fig. 3. If the idler be canted, it will avoid crossing the laps $e'$ and $e^6$ and bring the lap $e^6$ outside of the lap $e'$. That the arrangement shown in Fig. 3 will avoid any interference between the several laps of the rope is apparent from a simple inspection of it.

As before stated, each of the several pulleys is preferably an individual part; but each may consist of two or more parts, as shown in Fig. 3. The arrangement shown in this latter figure differs from that shown in Figs. 1 and 2 also in that the number of wraps is reduced to a minimum and the tightening-pulley is dispensed with. Where a tightening-pulley is used, it is preferably placed upon the last lap of the rope, this being a lap which is subjected to the least strain.

Having thus described my invention, the following is what I claim as new therein and desire to secure by Letters Patent:

1. In a device for transmitting power, the combination of a driven pulley, a driving-pulley, an idler, the driven pulley being disposed between the driving-pulley and idler, and a rope having a wrap embracing the driving and driven pulleys, a wrap embracing the driven pulley and idler and laps extending directly from the driving-pulley to the idler, substantially as set forth.

2. In a device for transmitting power, the combination of a driving-pulley and an idler each having a plurality of peripheral grooves, a driven pulley disposed between the driving-pulley and idler and having one more peripheral groove than either of them, and a rope having a plurality of wraps embracing the driving and driven pulleys, a plurality of wraps embracing the driven pulley and idler, a lap extending from the driving-pulley directly to the idler and occupying the corresponding end grooves of each, and a lap extending from the idler directly to the driving-pulley and occupying the opposite corresponding end grooves of each, substantially as set forth.

JOSEPH G. FALCON.

Witnesses:
 L. M. HOPKINS,
 I. CROSS.